(12) United States Patent
Chistyakov

(10) Patent No.: US 8,939,684 B2
(45) Date of Patent: Jan. 27, 2015

(54) CUTTING INSERT WITH CHIP-CONTROL ARRANGEMENT HAVING RECESS DEPTHS AND PROJECTION HEIGHTS WHICH INCREASE WITH DISTANCE FROM CUTTING EDGE

(75) Inventor: Sergey Chistyakov, Nahariya (IL)

(73) Assignee: Iscar, Ltd., Tefen (IL)

( * ) Notice: Subject to any disclaimer, the term of this patent is extended or adjusted under 35 U.S.C. 154(b) by 506 days.

(21) Appl. No.: 13/471,671

(22) Filed: May 15, 2012

(65) Prior Publication Data
US 2013/0309028 A1  Nov. 21, 2013

(51) Int. Cl.
*B23B 27/04* (2006.01)

(52) U.S. Cl.
CPC .................. *B23B 27/045* (2013.01)
USPC ........................ 407/117; 407/115

(58) Field of Classification Search
CPC ........ B23B 27/045; B23B 27/22; B23B 27/04
USPC .................................. 407/113–117
See application file for complete search history.

(56) References Cited

U.S. PATENT DOCUMENTS

| | | | |
|---|---|---|---|
| 4,214,845 A | | 7/1980 | Mori |
| 4,629,372 A | * | 12/1986 | Huston .......................... 407/116 |
| 4,969,779 A | * | 11/1990 | Barten .............. 407/114 |
| 5,375,948 A | * | 12/1994 | Lindstedt ....................... 407/116 |
| 5,577,867 A | * | 11/1996 | Paya ............. 407/114 |
| 5,660,507 A | * | 8/1997 | Paya ............. 407/114 |
| 5,676,495 A | * | 10/1997 | Katbi et al. .................... 407/114 |
| 6,676,339 B2 | | 1/2004 | Hartlöhner |
| 6,742,971 B2 | * | 6/2004 | Tong .............................. 407/117 |
| 7,051,631 B2 | * | 5/2006 | Gati ............................ 82/1.11 |
| 7,182,555 B2 | | 2/2007 | Kitagawa et al. |
| 7,241,083 B2 | * | 7/2007 | Nada et al. ..................... 407/114 |
| 7,320,564 B2 | * | 1/2008 | Gati .............................. 407/114 |
| 7,934,891 B2 | * | 5/2011 | Jonsson et al. ................. 407/114 |
| 8,137,035 B2 | | 3/2012 | Uchijo et al. |
| 8,585,330 B2 | * | 11/2013 | Yamazaki et al. ............. 407/113 |
| 8,770,895 B2 | * | 7/2014 | Inoue ............................ 407/115 |
| 2006/0269367 A1 | * | 11/2006 | Havrda ......................... 407/117 |
| 2007/0231089 A1 | | 10/2007 | Hecht |
| 2008/0219784 A1 | * | 9/2008 | Yamazaki et al. ............. 407/114 |
| 2009/0226269 A1 | * | 9/2009 | Iyori et al. ..................... 407/114 |
| 2013/0236258 A1 | * | 9/2013 | Nada et al. .................... 407/114 |

FOREIGN PATENT DOCUMENTS

| | | |
|---|---|---|
| CN | 101870017 | 10/2010 |
| EP | 2572816 | 3/2013 |
| JP | H06 55312 A | 3/1994 |
| WO | WO 2009/001973 | 12/2008 |

OTHER PUBLICATIONS

International Search Report dated Sep. 20, 2013 issued in PCT counterpart application (No. PCT/IL2013/050346).

* cited by examiner

*Primary Examiner* — Daniel Howell
*Assistant Examiner* — Nicole N Ramos
(74) *Attorney, Agent, or Firm* — Womble Carlyle

(57) ABSTRACT

A cutting insert has a cutting edge formed at an intersection of a rake surface and a relief surface, with a chip-control arrangement located at the rake surface. The chip-control arrangement includes a plurality of recesses that extend downwardly into the rake surface and a plurality of projections that extend upwardly from the rake surface. The plurality of recesses follow a pattern of increasing depth in a rearward direction from the forward portion of the cutting edge. The plurality of projections follow a pattern of increasing height in a rearward direction from the forward portion of the cutting edge.

36 Claims, 4 Drawing Sheets

CUTTING INSERT WITH CHIP-CONTROL ARRANGEMENT HAVING RECESS DEPTHS AND PROJECTION HEIGHTS WHICH INCREASE WITH DISTANCE FROM CUTTING EDGE

FIELD OF THE INVENTION

The subject matter of the present application relates to a chip-control arrangement for a cutting insert. Such arrangement can be formed on an insert configured for, inter alia, thread turning operations.

BACKGROUND OF THE INVENTION

Cutting inserts can be provided with a chip-control arrangement for controlling the flow of and/or controlling the shape and size of the swarf and debris resulting from metalworking operations.

Such chip-control arrangements usually consist of recesses and/or projections located near a cutting edge of the insert. Upon encountering the recesses and/or projections, metal chips can be created with specific shapes and can then be evacuated therefrom.

Various chip-control arrangements are disclosed in U.S. Pat. No. 7,182,555, U.S. Pat. No. 4,214,845, U.S. Pat. No. 6,742,971, U.S. Pat. No. 6,676,339, U.S. Pat. No. 8,137,035 and CN101870017.

For threading operations the shape of the cutting edge of the cutting insert is determined by the desired pointed form of the thread itself. However, the corresponding pointed form of the cutting edge is not the most advantageous shape for turning operations, and can lead to the cutting insert becoming damaged and unsuitable for use. To overcome this problem, one compromise is to achieve the desired depth of cut of the thread by performing several 'passes' on the work-piece, as opposed to a single 'pass'. Stated differently, the cutting operation is performed several times. Each 'pass' cuts deeper in to the work-piece, until the desired thread depth is achieved. Moreover, the multiple passes can be performed in one of several cutting methods. For example, the passes can be radial. That is to say, the tool is fed in a right angle to the work-piece. Alternately, flank infeed passes can be performed, whereby the tool is fed at an angle, usually between 3°-5°, in to the workpiece. Regardless of the cutting method performed, more than one pass is usually required.

SUMMARY OF THE INVENTION

In accordance with the subject matter of a first aspect of the present application there is provided a cutting insert comprising:
  a cutting portion, having a cutting portion axis defining a forward to rearward direction, the cutting portion comprising a cutting edge formed at an intersection of a rake surface and a relief surface; and
  a chip-control arrangement located at the rake surface;
the chip-control arrangement comprising:
  a plurality of recesses extending downwardly into the rake surface; and
  a plurality of projections extending upwardly from the rake surface;
wherein
  the plurality of recesses follow a pattern of increasing depth in a rearward direction from the forward portion of the cutting edge; and
  the plurality of projections follow a pattern of increasing height in a rearward direction from the forward portion of the cutting edge.

In accordance with the subject matter of a second aspect of the present application there is provided a cutting insert comprising:
  a cutting portion, having a cutting portion axis defining a forward to rearward direction, the cutting portion comprising a cutting edge formed at an intersection of a rake surface and a relief surface, the cutting edge being bisected by the cutting portion axis in a plan view of the cutting portion; and
  a chip-control arrangement located at the rake surface;
the chip-control arrangement comprising:
  a plurality of recesses extending downwardly into the rake surface; and
  a plurality of projections extending upwardly from the rake surface;
wherein
  the plurality of recesses follow a pattern of increasing depth in the rearward direction from where the cutting edge is bisected; and
  the plurality of projections follow a pattern of increasing height in the rearward direction from where the cutting edge is bisected.

The chip-control arrangement has been found to be advantageous for threading cutting inserts, in particular for working stainless steel. However such chip-control arrangements could possibly be advantageous for other types of operations, such as, for example, grooving.

It is understood that the above-said is a summary, and that features described hereinafter may be applicable in any combination to the subject matter of the present application, for example, any of the following features may be applicable to the cutting insert or chip-control arrangement:

The plurality of recesses can be arranged in recess rows, each recess row extends in a recess plane which is perpendicular to the cutting portion axis, and each recess of a first recess row has a first recess depth of smaller magnitude than a second recess depth of each recess of an adjacent second recess row which is axially further from the cutting edge than the first recess row.

The first recess row, which is axially closest to the cutting edge, can comprise exactly one recess.

Each recess row other than the first recess row axially closest to the cutting edge can comprise exactly two recesses.

The chip-control arrangement can comprise exactly three recess rows.

A recess row distance between adjacent pairs of recess rows can increase in the rearward direction.

The recesses in a third recess row can be further spaced-apart from each other than the recesses in the second recess row, the third recess row being axially further from the cutting edge than, and adjacent to, the second recess row.

The outermost recesses in each recess row, on at least one side of the cutting portion axis, can lie along a straight path, in a plan view of the cutting portion.

The straight path and the cutting edge can be parallel in a plan view of the cutting portion.

Each of the plurality of recesses can be substantially frusto-spherical.

The second recess row can be located forward of a rearmost portion of the cutting edge.

The cutting edge can comprise a first and a second side cutting edge having a corner cutting edge at the intersection thereof, the first and second cutting edges being transverse to the cutting portion axis in a plan view of the cutting portion.

The cutting edge can comprise a first and a second lateral cutting edge that extend from the first and second side cutting edges, respectively, and form an obtuse external angle therewith and are substantially perpendicular to the cutting portion axis in a plan view of the cutting portion.

The plurality of projections can be arranged in projection rows, each projection row can extend in a projection plane which is perpendicular to the cutting portion axis, and each projection of a first projection row has a first projection height of smaller magnitude than a second projection height of each projection of an adjacent second projection row which is axially further from the cutting edge than the first projection row.

Each projection row can be located between an adjacent pair of recess rows.

Two outermost recesses on the same side of the cutting portion axis in adjacent recess rows can be interposed, at least partially, by one of the plurality of projections.

The projection row axially closest to the cutting edge can comprise exactly one projection.

Each projection row other than the first projection row, which is axially closest to the cutting edge, can comprise exactly two projections.

The chip-control arrangement can comprise exactly two projection rows.

The chip-control arrangement can comprise an axial ridge that extends axially from a forwardmost projection in the rearward direction.

The chip-control arrangement can comprise two central convex ridges that extend from each outermost projection in a second forwardmost projection row to the rear portion of the axial ridge, respectively.

The chip-control arrangement can comprise an elongated nose which extends in a forward direction and is located between the outermost recesses in the rearmost recess row.

The chip-control arrangement can comprise two transverse convex ridges that extend between each outermost projection in a second forwardmost projection row and a forward portion of the elongated nose, respectively.

The forwardmost projection can be located axially rearward of the forwardmost recess.

The chip-control arrangement can comprise an inclined surface extending upwardly, that faces generally in the forward direction, and is located rearward of the rearmost recess row.

The cutting insert can comprise a chip deflecting surface that extends downwardly between the cutting edge and the chip-control arrangement.

In a plan view of the cutting portion, the chip-control arrangement can be disposed symmetrically about the cutting portion axis.

The cutting insert can have a cutting insert axis and comprise insert first and second sides connected by an insert peripheral surface which extends peripherally around the cutting insert. The cutting edge can be located on the insert peripheral surface and is spaced-apart from, and extends between, the insert first side and the insert second side.

The cutting insert can comprise exactly five cutting edges.

The cutting portion axis may bisect the cutting edge, in a plan view of the cutting portion.

The recess rows can alternate with the projection rows in the rearward direction.

The cutting edge can be symmetric about the cutting portion axis.

The first recess row, which is axially closest to where the cutting edge is bisected, can comprise exactly one recess.

The first projection row, which is axially closest to where the cutting edge is bisected, can comprise exactly one projection.

BRIEF DESCRIPTION OF THE FIGURES

For a better understanding of the present application and to show how the same may be carried out in practice, reference will now be made to the accompanying drawings, in which.

Figure 1:
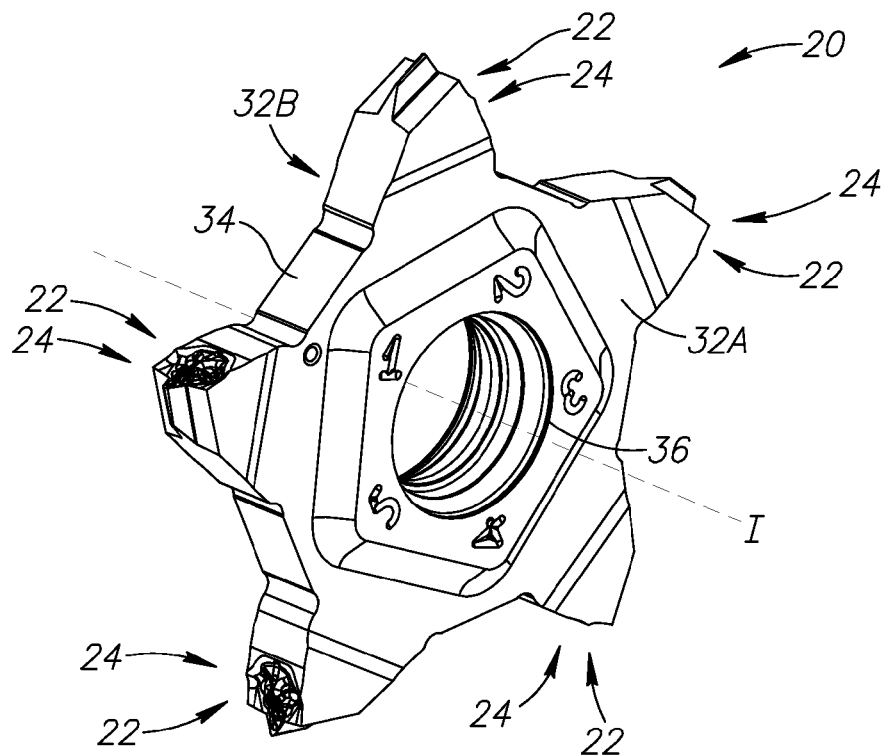
FIG. 1 is a perspective view of a cutting insert.

Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 2:
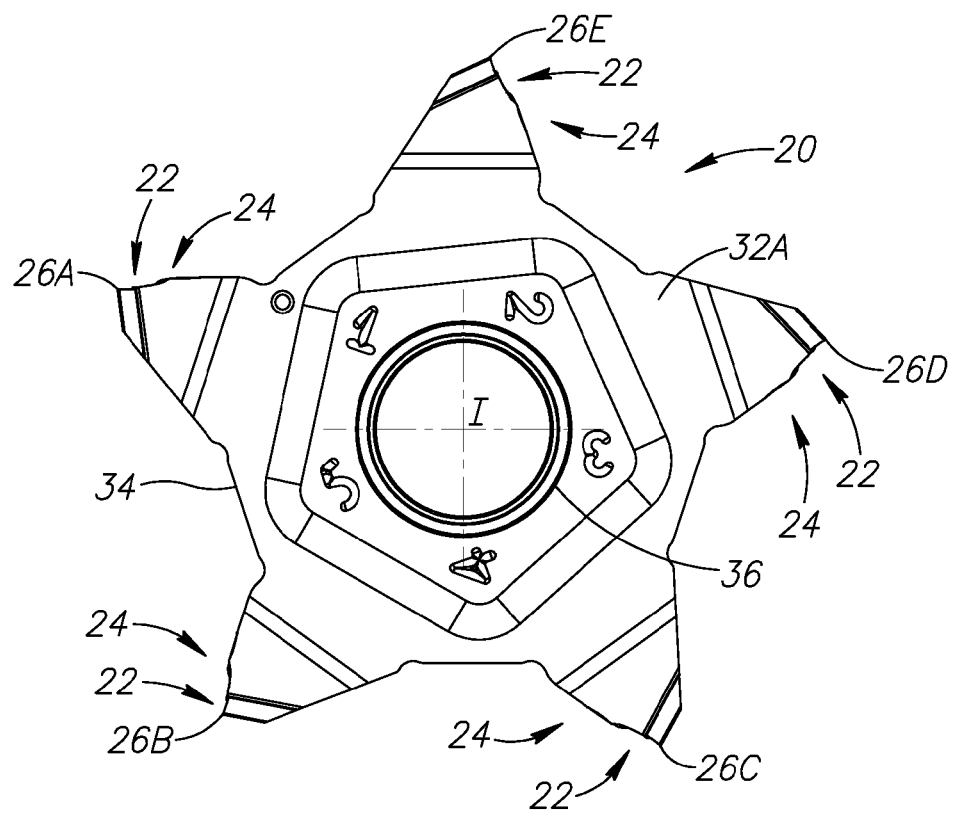
FIG. 2 is a side view of the cutting insert in FIG. 1.
Figure 3:
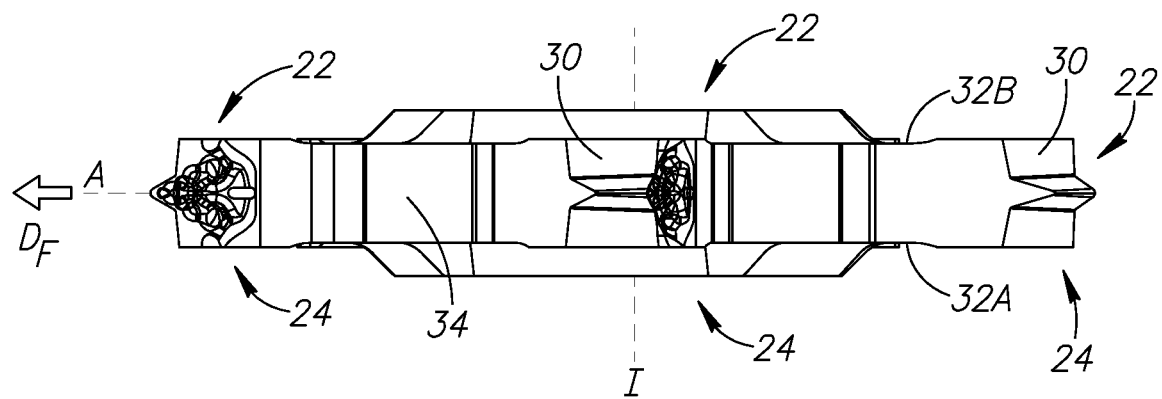
FIG. 3 is a plan view of the cutting insert in FIG. 1.

Attention is first drawn to FIGS. 1 to 3, showing a cutting insert 20 with a chip-control arrangement 22. The cutting insert 20 comprises a cutting portion 24, that has a cutting portion axis A defining a forward to rearward direction $D_F$, $D_R$. It should be appreciated that use of the terms "forward" and "rearward" throughout the description and claims refer to a relative position in a direction of the cutting portion axis A, generally towards the left and right, respectively, in FIGS. 3, 5 and 6. The cutting portion 24 comprises a cutting edge 26 formed at an intersection of a rake surface 28 and a relief surface 30. The cutting edge 26 can be symmetric about the cutting portion axis A. The cutting portion axis A may bisect the cutting edge 26, in a plan view of the cutting portion 24.

In accordance with some embodiments of the subject matter of the present application the cutting insert 20 can have a cutting insert axis I. The cutting insert 20 can comprise insert first and second sides 32A, 32B connected by an insert peripheral surface 34 which extends peripherally around the cutting insert 20. It is noticed, that, in this non-limiting example, the cutting insert 20 is formed with a clamping hole 36 located in the middle thereof (in a side view of the cutting insert 20) which opens out to the insert first and second sides 32A, 32B and is configured for receiving a clamping member (not shown) therethrough. It is understood that alternative methods of fastening an insert to an insert holder could be employed, for example clamping jaws, and therefore such inserts could be devoid of a clamping hole 36.

Figure 4:
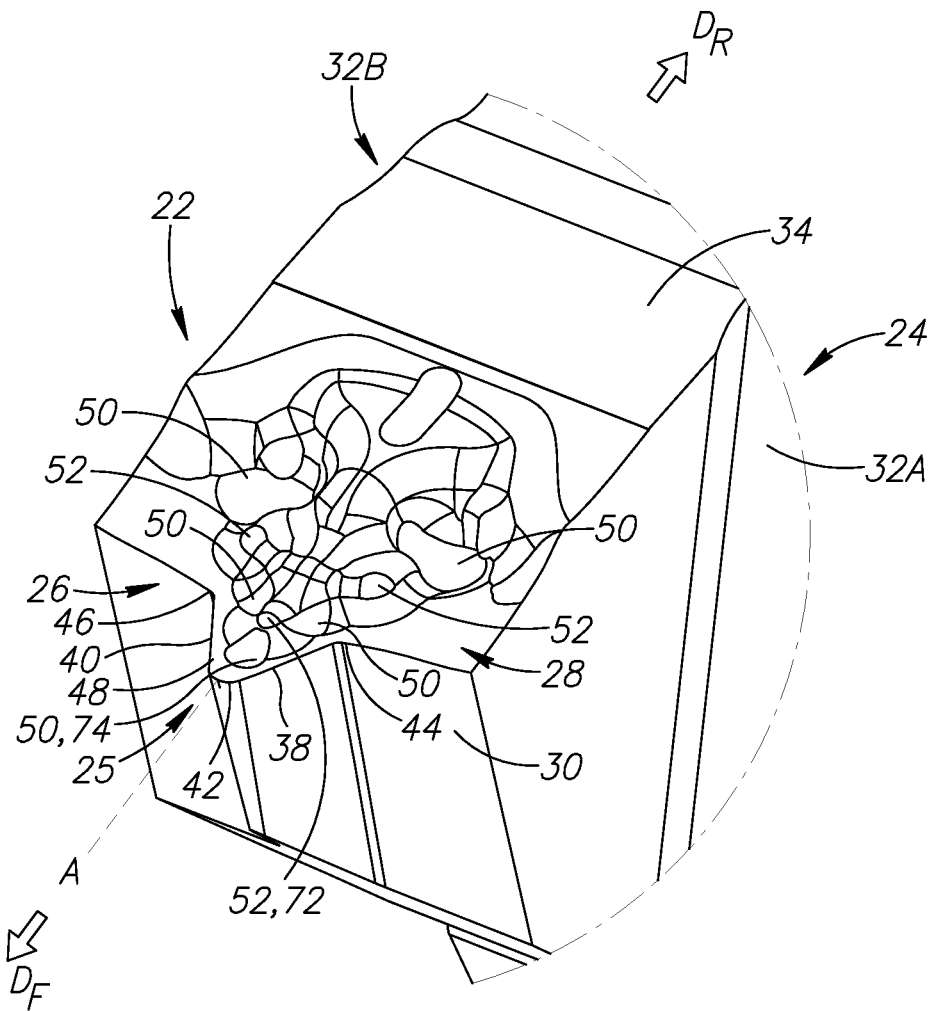
FIG. 4 is a perspective view of a cutting portion of the cutting insert in FIGS. 1 to 3.

Referring to FIG. 4, the cutting edge 26 can be located on the insert peripheral surface 34 and can be spaced-apart from, and extend between, the insert first side 32A and the insert second side 32B. The cutting edge 26 can comprise a first and second side cutting edge 38, 40 with a corner cutting edge 42 at the intersection thereof. The first and second side cutting edges 38, 40 can be transverse to the cutting portion axis A in a plan view of the cutting portion 24. The cutting edge 26 can comprise a first and a second lateral cutting edge 44, 46 which extend from the first and second side cutting edges 38, 40, respectively and form an obtuse external angle therewith, in the plan view of the cutting portion 24. In some embodiments, the first and second lateral cutting edges 44, 46 are substantially perpendicular to the cutting portion axis A in a plan view of the cutting portion 24. The purpose of the first and second lateral cutting edges 38, 40 is to provide a thread with a rounded crest truncation.

Figure 5:
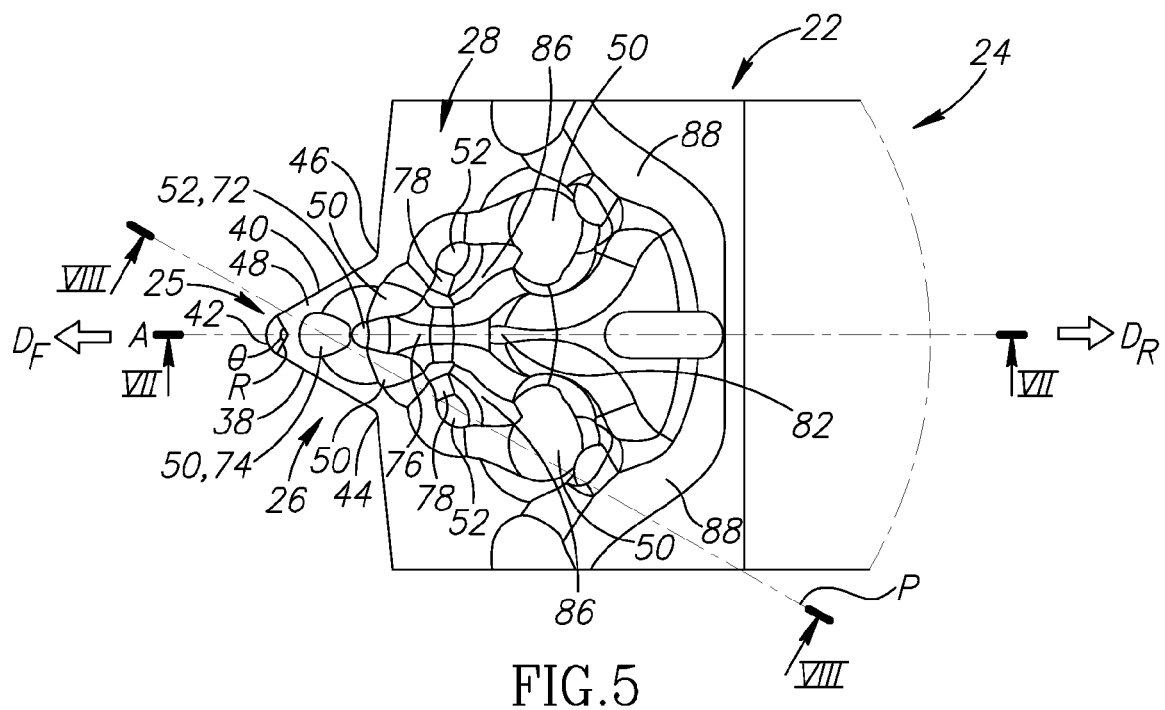
FIG. 5 is a plan view of the cutting portion of the cutting insert in FIG. 4.

Referring now to the plan view of the cutting portion 24 in FIG. 5, the corner cutting edge 42 of the cutting insert 20 can be curved at a predetermined radius of curvature R. In this non-limiting example, the corner cutting edge 42 subtends a corner angle θ of 125°. That is to say, the corner cutting edge 42 follows a 125° arc having radius of curvature R. In another non-limiting example, the corner cutting edge 42 subtends a corner angle θ of 120°. It is understood that the corner cutting edge 42 having a radius of curvature R subtends a corner angle θ which fulfills the condition 120°≤θ≤125°. Stated differently, the first and second side cutting edges 32A, 32B can form an angle in a range which is greater than or equal to 55° and less than or equal to 60°. The purpose of the corner cutting edge 42 and the first and second side cutting edge 38, 40 is to provide a thread with the desired pointed thread shape. Specifically, the shape of the corner cutting edge 42 defines the shape of the root truncation of the thread.

The cutting insert 20 can comprise exactly five cutting edges 26A, 26B, 26C, 26D, 26E. Whilst, in this non-limiting example, the cutting insert 20 is indexable with each of the five cutting edges 26A, 26B, 26C, 26D, 26E thereof being formed with the chip-control arrangement 22, it is sufficient for the description hereinafter to only refer to the cutting edge 26 at the cutting portion 24. It is also understood that a cutting insert in accordance with the subject matter of the present application could comprise one or more cutting portions 24 with such a chip-control arrangement 22 and one or more other cutting portions which are devoid of any chip-control arrangement or which are formed with a different chip-control arrangement. To elaborate, for example, the chip-control arrangement 22 could be deployed on any number of cutting portions of the cutting insert 20, and/or at least two or more cutting portions thereof, in a case where an insert is indexable.

Figure 7:
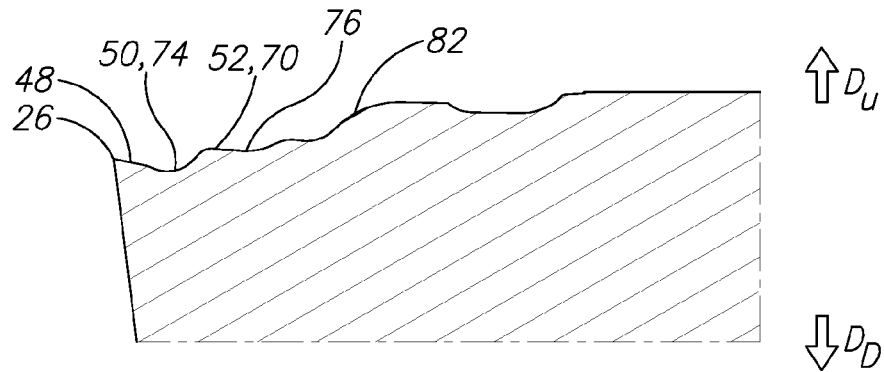
FIG. 7 is a cross section view taken along line VII-VII in FIG. 5.

In accordance with some embodiments of the subject matter of the present application, a chip deflecting surface 48 can extend downwardly between the cutting edge 26 and the chip-control arrangement 22. It should be appreciated that use of the terms "upward" and "downward" throughout the description and claims refer to a relative position in a direction perpendicular to the cutting portion axis A, generally upwards and downwards, respectively, in FIGS. 7 to 9.

Figure 9:
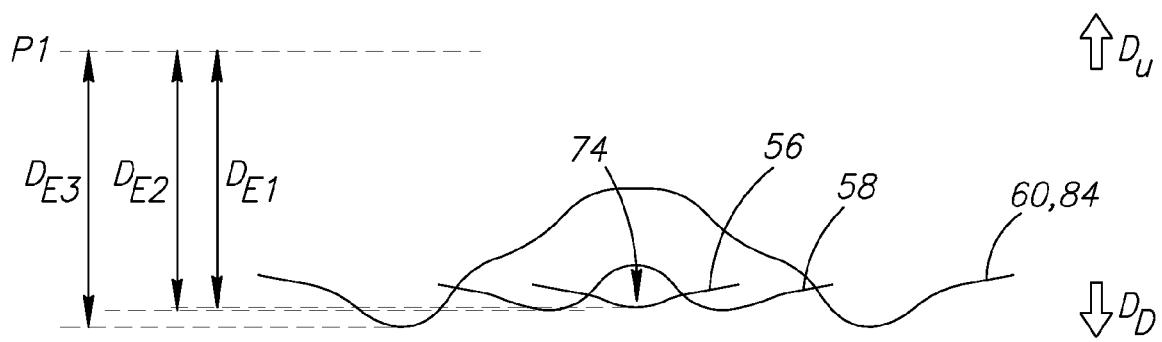
FIG. 9 is a superimposed view of 3 cross section views taken along recess planes in FIG. 8.

Referring now to FIG. 5, the chip-control arrangement 22 is located at the rake surface 28. The chip-control arrangement 22 comprises a plurality of recesses 50, 74 that extend downwardly into the rake surface 28 and a plurality of projections 52, 72 that extend upwardly from the rake surface 28. The chip-control arrangement 22 is intended to control the flow and/or the shape and size of the swarf and debris resulting from metalworking operations. Referring now to FIG. 9, which shows three cross-sectional views taken along each recess plane $P_R$ superimposed one on the other and looking along the cutting portion axis A in a rearward direction $D_R$, the plurality of recesses 50, 74 follow a pattern of increasing depth in a rearward direction $D_R$ from the forward portion 25 of the cutting edge 26. The depths are measured in a downward direction $D_D$ from an arbitrary first plane P1 located above the least deep recess.

Figure 6:
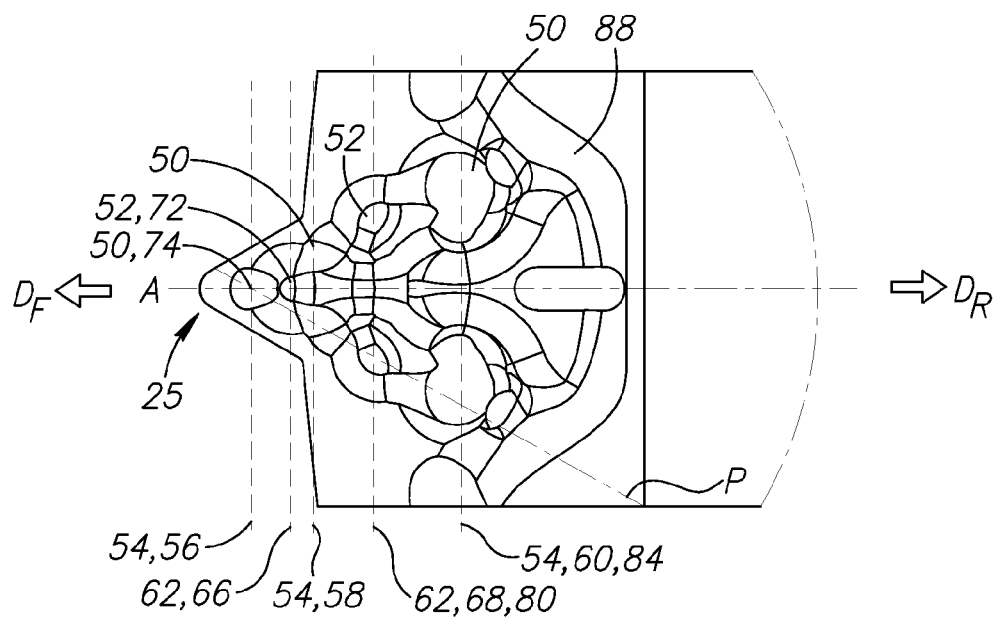
FIG. 6 is a plan view of the cutting portion of the cutting insert in FIG. 4.
Figure 8:
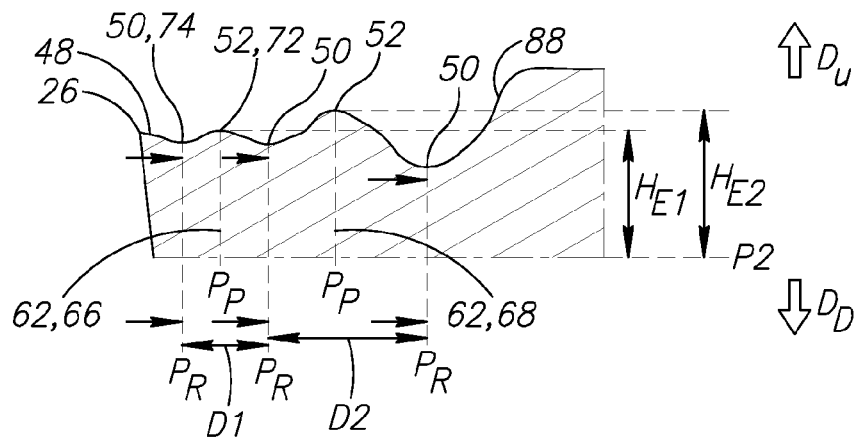
FIG. 8 is a cross section view taken along a line VIII-VIII in FIG. 5.

Referring to FIGS. 6 and 8, in accordance with some embodiments of the subject matter of the present application, the plurality of recesses 50, 74 can be arranged in recess rows 54, 56, 58, 60, 84. Each recess row 54 can extend in a recess plane $P_R$ which is perpendicular to the cutting portion axis A. Referring back to FIG. 9, each recess 50 of a first recess row 56 can have a first recess depth $D_{E1}$ of smaller magnitude than a second recess depth $D_{E2}$ of each recess 50 of an adjacent second recess row 58 which is axially further from the cutting edge 26 than the first recess row 56. i.e. $D_{E1}<D_{E2}$. Likewise, the second recess depth $D_{E2}$ of each recess 50 of the second recess row 58 is smaller than a third recess depth $D_{E3}$ of each recess 50 in a third recess row 60, the third recess row 60 being axially further from the cutting edge 26 than, and adjacent to, the second recess row 58. i.e. $D_{E2}<D_{E3}$.

The first recess row 56, which is axially closest to the cutting edge 26, i.e. the axially forwardmost recess row, can comprise exactly one recess 50. Referring back to FIG. 6, the first recess row 56, which is axially closest to the cutting edge 26, has a single recess 50 which straddles the cutting portion axis A. Each recess row 58, 60, 84 other than the first recess row 56 can comprise exactly two recesses 50. In a direction along the cutting portion axis A, a recess row distance D1, D2 between adjacent pairs of recess rows 54, 56, 58, 60, 84 can increase in the rearward direction $D_R$, and so in FIG. 8, D2>D1. In a direction perpendicular to the cutting portion axis A, the recesses 50 in the third recess row 60 can be further spaced-apart from each other than the recesses 50 in the second recess row 58.

As seen in FIGS. 5 and 6, the outermost recesses 50 in each recess row 54, 56, 58, 60, 84, on at least one side of the cutting portion axis A, can lie along a straight path P, in a plan view of the cutting portion 24. In recess rows 54 with only a single recess 50, the single recess 50 is the outermost recess 50. It should be appreciated that use of the term "outermost" throughout the description and claims refer to a relative position in a direction perpendicular to the cutting portion axis A, away from the cutting portion axis A, respectively, in FIGS. 5 and 6. The straight path P and the cutting edge 26 can be parallel in a plan view of the cutting portion 24.

In accordance with some embodiments of the subject matter of the present application each of the plurality of recesses 50 can be substantially frusto-spherical.

Referring back to FIG. 8, the plurality of projections 52, 72 follow a pattern of increasing height in a rearward direction $D_R$ from the forward portion 25 of the cutting edge 26. The heights are measured in an upward direction $D_U$ from an arbitrary second plane P2 located below the least high projection.

In accordance with some embodiments of the subject matter of the present application the plurality of projections 52 can be arranged in projection rows 62, 66, 68, 80. Each projection row 62, 66, 68, 80 can extend in a projection plane $P_P$ which is perpendicular to the cutting portion axis A. Each projection 52 of a first projection row 66 can have a first projection height $H_{E1}$ of smaller magnitude than a second projection height $H_{E2}$ of each projection 52 of an adjacent second projection row 68 which is axially further from the cutting edge 26 than the first projection row 66. i.e. $H_{E1}<H_{E2}$. Each projection row 62, 66, 68, 80 can be located between an adjacent pair of recess rows 54. Stated differently, the recess rows 54 alternate with the projection rows 62 in the rearward direction $D_R$. Two outermost recesses 50 on the same side of the cutting portion axis A, in adjacent recess rows 54, can be interposed, at least partially, by one of the plurality of projections 52. The first projection row 66, which is axially closest to the cutting edge 26, i.e. the axially forwardmost projection row, can comprise exactly one projection 52. Each projection row 68, 80 other than the first projection row 66 axially closest to the cutting edge 26 can comprise exactly two projections 52. A forwardmost projection 72 can be located axially rearward of a forwardmost recess 74.

In accordance with some embodiments of the subject matter of the present application the chip-control arrangement 22 can comprise exactly three recess rows 54, 56, 58, 60, 84. The chip-control arrangement 22 can comprise exactly two projection rows 62, 66, 68, 80.

Referring now to FIG. 5, the chip-control arrangement 22 can comprise an axial ridge 76 that extends axially from the forwardmost projection 72 in the rearward direction $D_R$. The chip-control arrangement 22 can comprise two central convex ridges 78 that extend from each outermost projection 52 in a second forwardmost projection row 80 towards a rear portion of the axial ridge 76. The two central convex ridges 78 can extend in a direction generally perpendicular to the cutting portion axis A. The chip-control arrangement 22 can comprise an elongated nose 82 which extends in a forward direction $D_F$ and which is located between the outermost recesses 50 in the rearmost recess row 84. The chip-control arrangement 22 can comprise two transverse convex ridges 86, which extend between each outermost projection 52 in the second forwardmost projection row 80 and a forward portion of the elongated nose 82, respectively. The chip-control arrangement 22 can comprise an inclined surface 88, extending upwardly, that faces generally in the forward direction $D_F$ and is located rearward of the rearmost recess row 84. In a plan view of the cutting portion, the chip-control arrangement 22 can be disposed symmetrically about the cutting portion axis A.

It should be noted that one feature of the subject matter of the present application is that the chip-control arrangement 22 is effective for thread cutting operations.

It should be further noted that another feature of the subject matter of the present application is that the chip-control arrangement 22 is effective at different cutting depths.

Another feature of the subject matter of the present application is that the chip-control arrangement 22 is effective for both radial infeed and flank infeed cutting methods.

It is understood that the chip-control arrangement 22 in accordance with the subject matter of the present application can be free of additional elements for achieving desired chip-control. Stated differently, a chip-control arrangement in accordance with the subject matter of the present application can comprise only a) the plurality of recesses 50 extending downwardly into the rake surface 28 that follow a pattern of increasing depth in a rearward direction $D_R$ from the forward portion 25 of the cutting edge 26 and b) the plurality of projections 52 extending upwardly from the rake surface 28 that follow a pattern of increasing height in a rearward direction $D_R$ from the forward portion 25 of the cutting edge 26. In other words, the chip-control arrangement can be devoid of any additional recess and/or projections.

Although the subject matter of the present application has been described to a certain degree of particularity, it should be understood that various alterations and modifications could be made without departing from the spirit or scope of the invention as hereinafter claimed.

What is claimed is:

1. A cutting insert (20) comprising:
   a cutting portion (24), having a cutting portion axis (A) defining a forward to rearward direction ($D_F$, $D_R$), the cutting portion (24) comprising a cutting edge (26) formed at an intersection of a rake surface (28) and a relief surface (30), the cutting edge (26) having a forward portion (25); and
   a chip-control arrangement (22) located at the rake surface (28);
   the chip-control arrangement (22) comprising:
   a plurality of recesses (50, 74) extending downwardly into the rake surface (28); and
   a plurality of projections (52, 72) extending upwardly from the rake surface (28);
   wherein
   the plurality of recesses (50, 74) follow a pattern of increasing depth in the rearward direction ($D_R$) from the forward portion of the cutting edge (26); and
   the plurality of projections (52, 72) follow a pattern of increasing height in the rearward direction ($D_R$) from the forward portion of the cutting edge (26).

2. The cutting insert (20) according to claim 1, wherein the plurality of recesses (50, 74) are arranged in recess rows (54, 56, 58, 60, 84), each recess row (54) extending in a recess plane ($P_R$) which is perpendicular to the cutting portion axis (A); and
   each recess (50, 74) of a first recess row (56) has a first recess depth ($D_{E1}$) of smaller magnitude than a second recess depth ($D_{E2}$) of each recess (50, 74) of an adjacent second recess row (58) which is axially further from the cutting edge (26) than the first recess row (56).

3. The cutting insert (20) according to claim 2, wherein the first recess row (56), which is axially closest to the cutting edge (26), comprises exactly one recess (50).

4. The cutting insert (20) according to claim 3, wherein each recess row (58, 60, 84) other than the first recess row (56) comprises exactly two recesses (50).

5. The cutting insert (20) according to claim 2, wherein the chip-control arrangement (22) comprises exactly three recess rows (54, 56, 58, 60, 84).

6. The cutting insert (20) according to claim 2, wherein a recess row distance (D1, D2) between adjacent pairs of recess rows (54, 56, 58, 60, 84) increases in the rearward direction ($D_R$).

7. The cutting insert (20) according to claim 2, wherein the recesses (50) in a third recess row (60) are further spaced-apart from each other than the recesses (50) in the second recess row (58), the third recess row (60) being axially further from the cutting edge (26) than, and adjacent to, the second recess row (56).

8. The cutting insert (20) according to claim 2, wherein the outermost recesses (50) in each recess row (54, 56, 58, 60, 84), on at least one side of the cutting portion axis (A), lie along a straight path (P), in a plan view of the cutting portion (24).

9. The cutting insert (20) according to claim 8, wherein the straight path (P) and the cutting edge (26) are parallel in a plan view of the cutting portion (24).

10. The cutting insert (20) according to claim 1, wherein each of the plurality of recesses (50) are substantially frusto-spherical.

11. The cutting insert (20) according to claim 2, wherein the second recess row (58) is located forward of a rearmost portion of the cutting edge (26).

12. The cutting insert (20) according to claim 1, wherein the cutting edge (26) comprises a first and a second side cutting edge (38, 40) having a corner cutting edge (42) at the intersection thereof, the first and side second cutting edges (38, 40) being transverse to the cutting portion axis (A) in a plan view of the cutting portion (24).

13. The cutting insert (20) according to claim 12, wherein the cutting edge (26) further comprises a first and a second lateral cutting edge (44, 46), extending from the first and second side cutting edges (38, 40), respectively, and forming an obtuse external angle therewith, and being substantially perpendicular to the cutting portion axis (A) in a plan view of the cutting portion (24).

14. The cutting insert (20) according to claim 2, wherein the plurality of projections (52) are arranged in projection rows (62, 66, 68, 80), each projection row (62, 66, 68, 80) extending in a projection plane ($P_P$) which is perpendicular to the cutting portion axis (A), and each projection (52, 72) of a first projection row (66) has a first projection height (HO of smaller magnitude than a second projection height ($H_{E2}$) of each projection (52, 72) of an adjacent second projection row (68) which is axially further from the cutting edge (26) than the first projection row (66).

15. The cutting insert (20) according to claim 14, wherein each projection row (62, 66, 68, 80) is located between an adjacent pair of recess rows (54).

16. The cutting insert (20) according to claim 15, wherein two outermost recesses (50) on the same side of the cutting portion axis (A) in adjacent recess rows (54) are interposed, at least partially, by one of the plurality of projections (52).

17. The cutting insert (20) according to claim 14, wherein the first projection row (66), which is axially closest to the cutting edge (26), comprises exactly one projection (52).

18. The cutting insert (20) according to claim 17, wherein each projection row (68, 80) other than the first projection row (66) comprises exactly two projections (52).

19. The cutting insert (20) according to claim 14, wherein the chip-control arrangement (22) comprises exactly two projection rows (62, 66, 68, 80).

20. The cutting insert (20) according to claim 14, wherein the chip-control arrangement (22) further comprises an axial ridge (76) extending axially from a forwardmost projection (72) in the rearward direction ($D_R$).

21. The cutting insert (20) according to claim 20, wherein the chip-control arrangement (22) further comprises two central convex ridges (78) extending from each outermost projection (52) in a second forwardmost projection row (80) to a rear portion of the axial ridge (76), respectively.

22. The cutting insert (20) according to claim 14, wherein the chip-control arrangement (22) further comprises an elongated nose (82) extending in a forward direction ($D_F$) and located between the outermost recesses (50) in the rearmost recess row (84).

23. The cutting insert (20) according to claim 22, wherein the chip-control arrangement (22) further comprises two transverse convex ridges (86), extending between each outermost projection (52) in a second forwardmost projection row (80) and a forward portion of the elongated nose (82), respectively.

24. The cutting insert (20) according to claim 1, wherein the forwardmost projection (72) is located axially rearward of the forwardmost recess (74).

25. The cutting insert (20) according to claim 1, wherein the chip-control arrangement (22) further comprises an inclined surface (88), extending upwardly and facing generally in the forward direction ($D_F$), and located rearward of the rearmost recess row (84).

26. The cutting insert (20) according to claim 1, further comprising a chip deflecting surface (48) extending downwardly between the cutting edge (26) and the chip-control arrangement (22).

27. The cutting insert (20) according to claim 1, wherein, in a plan view of the cutting portion (24), the chip-control arrangement (22) is disposed symmetrically about the cutting portion axis (A).

28. The cutting insert (20) according to claim 1, having a cutting insert axis (I) and comprising
insert first and second sides (32A, 32B) connected by an insert peripheral surface (34) which extends peripherally around the cutting insert (20), and
the cutting edge (26) is located on the insert peripheral surface (34) and is spaced-apart from, and extends between, the insert first side (32A) and the insert second side (32B).

29. The cutting insert (20) according to claim 28, comprising exactly five cutting edges (26A, 26B, 26C, 26D, 26E).

30. A cutting insert (20) comprising:
a cutting portion (24), having a cutting portion axis (A) defining a forward to rearward direction ($D_F$, $D_R$), the cutting portion (24) comprising a cutting edge (26) formed at an intersection of a rake surface (28) and a relief surface (30), the cutting edge (26) being bisected by the cutting portion axis (A) in a plan view of the cutting portion (24); and
a chip-control arrangement (22) located at the rake surface (28);
the chip-control arrangement (22) comprising:
a plurality of recesses (50, 74) extending downwardly into the rake surface (28); and
a plurality of projections (52, 72) extending upwardly from the rake surface (28);
wherein
the plurality of recesses (50, 74) follow a pattern of increasing depth in the rearward direction ($D_R$) from where the cutting edge (26) is bisected; and
the plurality of projections (52, 72) follow a pattern of increasing height in the rearward direction ($D_R$) from where the cutting edge (26) is bisected.

31. The cutting insert (20) according to claim 30, wherein the plurality of recesses (50, 74) are arranged in recess rows (54, 56, 58, 60, 84), each recess row (54) extending in a recess plane ($P_R$) which is perpendicular to the cutting portion axis (A);
each recess (50, 74) of a given recess row (56, 58) has a recess depth of smaller magnitude than a recess (50) belonging to an adjacent recess row (58, 60) which is axially further from the cutting edge (26) than said given recess row (56, 58).

32. The cutting insert (20) according to claim 31, wherein the plurality of projections (52, 74) are arranged in projection rows (62, 66, 68, 80), each projection row (62, 66, 68, 80) extending in a projection plane ($P_P$) which is perpendicular to the cutting portion axis (A),
each projection (52, 72) of a given projection row (66) has a projection height of smaller magnitude than a projection (52) belonging to an adjacent projection row (68) which is axially further from the cutting edge (26) than said given projection row (66).

33. The cutting insert (20) according to claim 32, wherein the recess rows (54) alternate with the projection rows (62) in the rearward direction ($D_R$).

34. The cutting insert (20) according to claim 32, wherein the cutting edge (26) and the chip control arrangement (22) are symmetric about the cutting portion axis (A).

35. The cutting insert (20) according to claim 34, wherein
a first recess row (56), which is axially closest to where the cutting edge is bisected, comprises exactly one recess (74); and
a first projection row (66), which is axially closest to where the cutting edge is bisected, comprises exactly one projection (72).

36. The cutting insert (20) according to claim 35, wherein
each recess row other than the first recess row (58, 60, 84) comprises exactly two recesses (50); and
each projection row other than the first projection row (68, 80) comprises at least two projections (52).

* * * * *